United States Patent Office 3,480,040
Patented Nov. 25, 1969

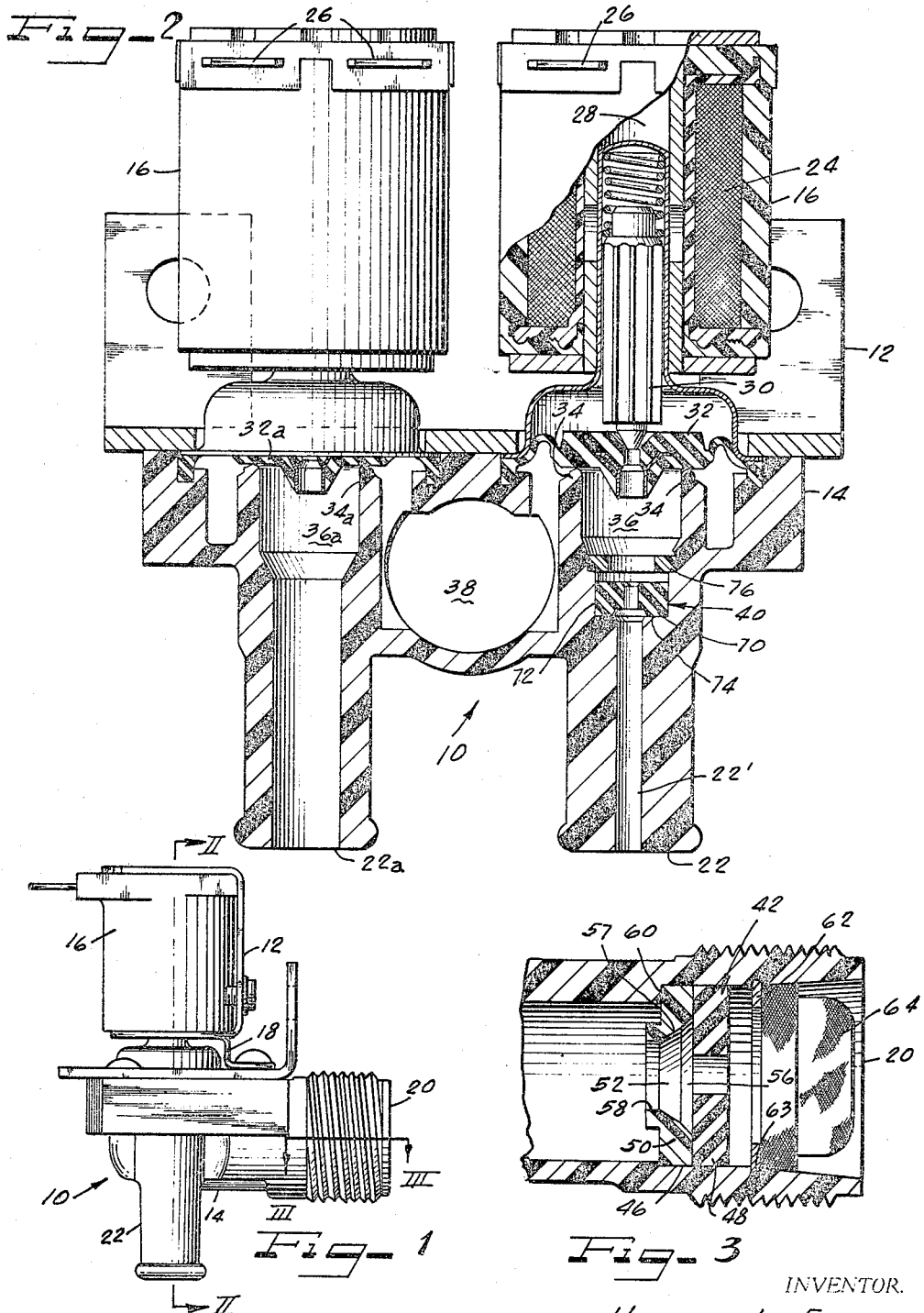

3,480,040
SINGLE-INLET, DOUBLE-OUTLET VALVE
Howard L. Erickson, Bensenville, Ill., assignor to The Dole Valve Company, Morton Grove, Ill., a corporation of Illinois
Filed Oct. 20, 1965, Ser. No. 498,417
Int. Cl. F16k *11/22, 11/24*
U.S. Cl. 137—608                                  7 Claims

ABSTRACT OF THE DISCLOSURE

A single-inlet, double-outlet valve to control fluid flow including a valve body having respective zones in communication with the inlet and outlets, a pair of flexible diaphragms for selectively closing and opening communication between the zones, a pair of solenoids operatively associated with the flexible diaphragms, and a first fluid control means in the inlet of the valve and a second fluid flow control means in one of the outlets.

---

This invention relates to valves and especially valves of the type having a single inlet and a plurality of outlets. A novel valve constructed in accordance with the present invention is characterized by having a high rate of flow control means acting at the inlet and a second low rate of flow control means acting at one of the outlets whereby improved flow control is achieved.

My invention has as its principal object to provide a new and improved valve.

It is a more particular object of my invention to provide a new and improved single-inlet, double-outlet valve having a unique flow control function.

The organization and manner of operation of the invention, together with further objects and advantages thereof may best be understood by reference to the following description taken in connection with the accompanying drawing, in the several figures of which like reference numerals identify like elements, and in which an exemplification of the invention is illustrated.

FIG. 1 is a side elevational view of a single-inlet, double-outlet valve constructed in accordance with the present invention;

FIG. 2 is a front elevational view, partly in section, of the valve of FIG. 1 with parts broken away to show interior parts; and FIG. 3 is a sectional view of part of the valve of FIGS. 1 and 2 as seen from the line III—III of FIG. 1.

The valves of the present invention find special utility in the environment of a single-temperature, automatic washing machine in which it is desirable to limit the flow of water in a detergent-dissolving operation of the machine to a volume specified in proportion to the volume limited overall flow rate. However, the valves of the present invention are of a more general utility and are not limited to this use.

Referring to FIG. 1 there is depicted a solenoid activated single-inlet, double-outlet valve generally indicated by the numeral 10. The valve 10 has an upper actuator portion 12 and a lower body portion 14. The body 14 is preferably constructed of nylon. The upper portion 12 comprises two electrically actuated solenoids 16 mounted on the valve body 14 in a conventional manner by a bracket 18. The body portion 14 of the valve 10, through which the fluid flows, comprises a cylindrically shaped and male-threaded inlet 20 for connection to a pressurized fluid source and a pair of generally cylindrical outlets 22 for connection to fluid utilizing apparatus, the flow to which is desired to be regulated.

As may best be seen in FIG. 2, the solenoids 16, which may be entirely conventional, comprise an insulated core movement electric coil 24, each having a pair of electrical terminals 26. Within the center cylindrical space 28 of each coil 24 is a ferromagnetic core 30 mounted for motion along the axis of the coil 24 in response to the current therethrough. The cores 30 of each solenoid 16 may be activated independently to open or close a movable and flexible diaphragm 32 or 32a. The diaphragms 32 and 32a are mounted to and form part of the body 14. They cooperate with the circular edges 34, 34a of two cylindrically shaped internal passages 36 and 36a which are in communication, respectively, with outlets 22 and 22a. Except for the diaphragms 32 and 32a, both outlets 22 and 22a are, respectively, in communication via passages 36 and 36a with a mix chamber 38 which is in direct communication with the inlet 20.

In accordance with the invention the outlet 22 and, as may best be seen in FIG. 3, the inlet 20 are provided with fluid flow control means respectively designated 40 and 42. The fluid control means 42 comprises a generally annular member 48 of elastic material which is positioned in a plane normal to, and concentric with the axis of the inlet 20. The member 48 is positioned in an enlarged portion 46 of the inlet 20 and rests against a rigid annular support member 50 set within portion 46 downstream from member 48. The member 50 has a central opening 52 with an interior surface formed in the shape of a pair of truncated cones 56 and 57 narrowing to a cylindrical portion 58. The rigid member 50 is captivated within the passage of the inlet 20 and abuts against a shoulder 60 formed in the walls of the passage. Upstream from the member 46 is a locking ring 62 set within a slight depression 63 of the walls of the inlet 20 which completes the captivation of the member 48 within the passageway of the inlet 20. The lock ring 62 is preferably affixed to a fine mesh screen 64 which serves the conventional function of such screens. The screen 64 is preferably, in one embodiment, a 60 mesh Monel screen.

As best shown in FIG. 2, the fluid control means 40 comprises a second elastic generally annular member 70 affixed in a cylindrical bore 72 of enlarged diameter than the small diameter passage 22′, and having one surface abutting against the shoulder 74 formed at the end of the bore 72 opening into the passage 22′. The member 70 is captivated within the bore 72 by means of a locking washer 76 which allows free fluid communication from the zone 36 to member 70.

In operation the single-inlet, double-outlet valve 10 is mounted in an environment of use such as an automatic washer. The inlet 20 is connected to a source of fluid such as the conventional water mains. The outlet 22a is connected to a fluid use apparatus such as the washing tub of a washer, and the outlet 22 is connected to a second fluid use apparatus, such as the detergent cup of the washer. With the solenoids connected to a control mechanism such as an automatic washer timer, in overall operation the valve 10 provides, in a preselected manner, fluid flow and fluid pressure from the inlet 20 to outlets 22 and 22a. Fluid enters from the inlet 20 and passes through flow control means 42 to enter chamber 38 where, depending upon the activation of the solenoid 16 it may or may not pass into zones 36 or 36a. If one or the other of the solenoids 16 are activated, the plunger 30 is withdrawn from the zone 36 or 36a and the flexible diaphragms 32 or 32a are caused to rise away from the circular edges 34a of the zones 36, 36a by a differential in fluid pressure across the diaphragm and fluid communication is established between the chamber 38 and zone 36 or 36a.

From the zone 36a the fluid may flow directly through the outlet 22a to fluid use apparatus. From the zone 36 the fluid flows through fluid flow control means 40 into the passage 22′ and then out of the outlet 22 to its fluid use apparatus.

In accordance with the invention the fluid flow control means 42 provides overall flow control by means of the elastic member 48. As the flow or pressure difference across this member increases, it is deformed or bent centrally thereof in the direction of flow into the opening 52 of the member 50. This deformation causes a decrease in the effective flow area of the opening of the annular member 48 and tends to lessen the fluid flow therethrough. Similarly, the fluid flow control means 40 functions to limit and control the fluid flow from the zone 36 into the passage 22', and achieves with the solenoid operated diaphragms 32 the fluid flow and transfer function of the valve 10.

In one example of the invention constructed for use in a single temperature motor supply automatic washing machine overall fluid flow control means 42 was constructed so as to achieve an inlet fluid flow of 5.5 liters or 1.45 gallons of water per minute, while the outlet fluid flow control means 40 was constructed to achieve a fluid flow of 1.2 liters or 0.307 gallon of water per minute.

It should now be apparent that a new and improved valve has been described in which a unique flow function is achieved.

It will be apparent that many modifications and variations may be effected without departing from the scope and the novel concepts of the present invention.

I claim as my invention:

1. A valve having a single inlet and two outlets; a first fluid flow control means affixed at said single inlet being deformed under the pressure of fluid flow for achieving essentially constant fluid flow therethrough for all flow above a minimal pressure difference thereacross; and a second fluid flow control means affixed at one at least of said outlets being deformed under the pressure of fluid flow for achieving essentially constant fluid flow therethrough for all flow above a minimal pressure difference thereacross.

2. The valve constructed in accordance with claim 1 in which said first fluid flow control means comprises a generally annular-shaped member of elastic material positioned in a plane normal to the direction of fluid flow in said inlet.

3. The valve constructed in accordance with claim 2 in which said second fluid flow control means comprises an annular-shaped member of elastic material positioned in a plane normal to the direction of fluid flow in said one outlet.

4. A single-inlet, double-outlet valve comprising: a valve body having a first zone in communication with said single inlet, a second zone in communication with a first outlet and a third zone in communication with a second outlet; and a pair of flexible diaphragms for selectively closing and opening communication between said first and second zones and between said first and third zones, respectively; a pair of solenoids operatively mounted on said body for activating respectively one each of said diaphragms to achieve fluid communication between said zones; a first fluid flow control means affixed at said single inlet being deformable by the pressure of fluid flow for achieving essentially constant fluid flow therethrough for all flow above a minimal pressure difference thereacross; and a second fluid flow control means affixed at said second outlet being deformable by the pressure of fluid flow for achieving essentially constant fluid flow therethrough for all flow above a minimal pressure difference thereacross.

5. The valve constructed in accordance with claim 4 in which said first fluid flow control means comprises a generally annular-shaped member of elastic material positioned in a plane normal to the direction of fluid flow in said inlet.

6. The valve constructed in accordance with claim 5 in which said second fluid flow control means comprises an annular-shaped member of elastic material positioned in a plane normal to the direction of fluid flow in said second outlet.

7. A single-inlet, double-outlet valve comprising: a valve body having a first zone in communication with said single inlet, a second zone in communication with a first outlet and a third zone in communication with a second outlet; and a pair of flexible diaphragms for selectively closing and opening communication between said first and second zones and between said first and third zones, respectively; a first fluid flow control means comprising a first generally annular member of elastic material positioned in a plane normal to and concentric with the axis of said inlet in an enlarged portion of said inlet with one surface normal to said axis resting against a rigid generally annular support member also within said enlarged portion and captivated against a shoulder of said inlet downstream from said elastic member, said rigid member having an opening shaped in two truncated cone surface segments narrowing downstream from said elastic member into a cylindrical surface portion, and a locking washer set upstream from said first elastic member in a circular depression in said inlet to control the fluid flow therethrough for flow above a minimal pressure difference thereacross; and a second fluid flow control means comprising a second elastic generally annular member affixed in a cylindrical bore of enlarged diameter in one of said outlets, said second elastic member being positioned in a plane normal to the direction of flow through said one outlet and having one annular surface abutting against a shoulder formed between said bore and said one outlet's decreased diameter passage, said second flow control means further comprising a captivating locker washer affixed in a matrix depression in said bore upstream from said second elastic member to control the fluid flow therethrough for flow above a minimal pressure difference thereacross.

References Cited

UNITED STATES PATENTS

| | | | |
|---|---|---|---|
| 2,500,750 | 3/1950 | Halenza | 251—120 |
| 2,542,279 | 2/1951 | Kempton | 251—137 |
| 2,708,092 | 5/1955 | Smith | 251—331 |
| 2,844,352 | 7/1958 | Dahl | 137—609 |
| 2,888,234 | 5/1959 | Dahl | 251—118 |
| 3,077,903 | 2/1963 | Honsinger | 138—45 |
| 3,195,561 | 7/1965 | Sovitzky | 251—148 |

FOREIGN PATENTS 946,585  1/1964  Great Britain.

M. CARY NELSON, Primary Examiner

W. R. CLINE, Assistant Examiner

U.S. Cl. X.R.

251—120, 129